United States Patent
Nam et al.

(10) Patent No.: US 12,319,572 B2
(45) Date of Patent: Jun. 3, 2025

(54) HYDROGEN STORAGE COMPOSITE MATERIAL AND MANUFACTURING METHOD THEREOF

(71) Applicants: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

(72) Inventors: Dong Hoon Nam, Suwon-si (KR); Kyung Moon Lee, Uiwang-si (KR); Hoonmo Park, Seongnam-si (KR); Young Jin Cho, Gimhae-si (KR); Byeongsoo Shin, Uiwang-si (KR); Eun Seon Cho, Daejeon (KR); Hyung Wan Do, Daejeon (KR)

(73) Assignees: Hyundai Motor Company, Seoul (KR); Kia Motors Corporation, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 417 days.

(21) Appl. No.: 16/952,400

(22) Filed: Nov. 19, 2020

(65) Prior Publication Data

US 2022/0048765 A1    Feb. 17, 2022

(30) Foreign Application Priority Data

Aug. 11, 2020    (KR) .................. 10-2020-0100582

(51) Int. Cl.
| | | |
|---|---|---|
| *C01B 3/00* | (2006.01) | |
| *C01B 32/198* | (2017.01) | |
| *C01B 35/02* | (2006.01) | |
| *B82Y 30/00* | (2011.01) | |
| *B82Y 40/00* | (2011.01) | |

(52) U.S. Cl.
CPC .......... *C01B 3/0021* (2013.01); *C01B 3/0078* (2013.01); *C01B 32/198* (2017.08); *C01B 35/023* (2013.01); *B82Y 30/00* (2013.01); *B82Y 40/00* (2013.01)

(58) Field of Classification Search
CPC . C01B 3/00021; C01B 3/0078; C01B 32/198; C01B 35/023; B82Y 30/00; B82Y 40/00
USPC ...................................................... 423/658.2
See application file for complete search history.

(56) References Cited

FOREIGN PATENT DOCUMENTS

| CN | 102718183 B | * | 5/2014 | |
| WO | WO-2015050351 A1 | * | 4/2015 | ........... B82B 3/0033 |

OTHER PUBLICATIONS

Machine Translation of CN 102718183 B. (Year: 2014).*
Machine Translation of WO 2015050351 A1. (Year: 2015).*
McCoy et al. "Graphene oxide: a surfactant or particle?", 2019. Current Opinion in Colloid & Interface Science, p. 98-109. (Year: 2019).*
Kostoglou et al. "Synthesis of nanoporous graphene oxide adsorbents by freeze-drying or microwave radiation: Characterization and hydrogen storage properties". International Journal of Hydrogen Energy 40 (2015), p. 6844-6852. (Year: 2015).*
Javadian et al. "Hydrogen Desorption Properties of Bulk and Nanoconfined LiBH4-NaAlH4". Crystals (2016), 6, 70, p. 1-12. (Year: 2016).*
Ngene et al. "Reversibility of the hydrogen desorption from NaBH4 by confinement in nanoporous carbon". Energy Environ. Sci. 2011, 4, 4108-4115. (Year: 2011).*

* cited by examiner

*Primary Examiner* — Melissa S Swain
*Assistant Examiner* — Catriona M Corallo
(74) *Attorney, Agent, or Firm* — Morgan, Lewis & Bockius LLP

(57) ABSTRACT

A hydrogen storage composite material includes: a graphene oxide framework provided as a porous structure and having an average pore diameter of 1 to 2 nm; and the graphene oxide framework is impregnated with a metal hydride, the graphene oxide framework comprises: a graphene oxide; and a linker connecting the graphene oxide.

4 Claims, No Drawings

HYDROGEN STORAGE COMPOSITE MATERIAL AND MANUFACTURING METHOD THEREOF

CROSS-REFERENCE TO RELATED APPLICATION

This application claims the benefit of Korean Patent Application No. 10-2020-0100582, filed on Aug. 11, 2020, in the Korean Intellectual Property Office, the disclosure of which is incorporated herein by reference.

TECHNICAL FIELD

The present disclosure relates to a hydrogen storage composite material and a manufacturing method thereof, and more particularly, a hydrogen storage composite material having excellent hydrogen storage performance by combining metal hydride, a hydrogen storage material that can replace a high-pressure hydrogen storage tank, and a graphene oxide framework, a carbon-based matrix material, and a manufacturing method thereof.

BACKGROUND

Fossil fuels, which are currently the most widely used energy sources, generate greenhouse gases such as carbon dioxide and air pollutants such as fine dust. Such that it is important to develop new renewable energy to reduce dependence on fossil fuels.

Hydrogen, one of the new renewable energy resources, is an eco-friendly energy resource that does not generate air pollutants during combustion, and can be applied to almost all fields of the energy system, including domestic and industrial fuel cells.

However, it is difficult to safely store hydrogen in the conventional liquid hydrogen storage method using a high-pressure hydrogen storage tank because there is always a risk of explosion. Therefore, recently, a material-based storage method capable of replacing the existing high-pressure hydrogen storage tank has been studied.

As a hydrogen storage material, a metal hydride is known that has a high hydrogen storage capacity and is capable of releasing hydrogen even at an operating temperature of a polymer electrolyte fuel cell below 100° C.

In order to improve the hydrogen storage performance of metal hydride, there have been attempts to infiltrate metal hydride into a light-weight carbon-based porous matrix. However, the previous carbon porous matrix had a pore size of 5 to 10 nm or more, which was not sufficiently small, and an additional catalyst doping process was required to further improve the performance. In addition, there is a problem that the hydrogen storage capacity is low because the amount of the permeated active material is less than 10 wt %. As a carbon-based porous matrix material, carbon nanotubes, which have been studied a lot in the past, require a separate separation process to increase purity in order to keep the pore size constant, resulting in a problem of inferior price competitiveness.

SUMMARY

Aspect of the present disclosure is to provide a hydrogen storage composite material with improved hydrogen storage performance and a manufacturing method thereof.

In accordance with one aspect of the present disclosure, a hydrogen storage composite material includes: a graphene oxide framework provided as a porous structure and having an average pore diameter of 1 to 2 nm; and the graphene oxide framework is impregnated with a metal hydride.

The graphene oxide framework may include: a graphene oxide; and a linker connecting the graphene oxide.

The linker may be provided as a diboronic acid.

The graphene oxide framework may include boron.

The metal hydride may include at least one of $MAlH_4$ or $MBH_4$. Here, M is an alkali metal.

The metal hydride may include at least one of $NaAlH_4$, $NaBH_4$, $LiBH_4$ or $LiAlH_4$.

The graphene oxide framework may have a hydrophobic surface.

The hydrogen emission temperature may be 25~100° C.

In accordance with one aspect of the present disclosure, a manufacturing method of a hydrogen storage composite material includes: a first step of adding graphene oxide to a solvent and ultrasonic grinding; a second step of forming a graphene oxide framework by providing a linker on the graphene oxide; and a third step of supporting metal hydride on the graphene oxide framework.

In the second step, the graphene oxide framework may be provided by a solvothermal reaction.

The linker may be provided as a diboronic acid.

The metal hydride may include at least one of $MAlH_4$ or $MBH_4$. Here, M is an alkali metal.

The metal hydride may include at least one of $NaAlH_4$, $NaBH_4$, $LiBH_4$ or $LiAlH_4$.

The graphene oxide framework may include boron.

DETAILED DESCRIPTION

This specification does not describe all elements of the embodiments, and general content or content overlapping between the embodiments in the technical field to which the present invention belongs will be omitted.

In addition, when a part "includes" a certain component, it means that other components may be further included rather than excluding other components unless specifically stated to the contrary.

Singular expressions include plural expressions, unless the context clearly has exceptions.

Hereinafter, the present disclosure will be described in detail.

The hydrogen storage composite material according to an embodiment of the present disclosure may be obtained by infiltrating a metal hydride into a graphene oxide framework synthesized through a solvothermal reaction between graphene oxide and a linker through a wet impregnation method.

The linker is a material that may chemically react with a functional group of graphene oxide to form a graphene oxide framework, and may be diboronic acid, benzene-diboronic acid, and for example, benzene-1,4-diboronic acid. Diboronic acid contains boron (B) atoms that act as catalysts for hydrogen emission reactions, so it may improve the hydrogen emission performance by improving the kinetic properties of metal hydrides. That is, the hydrogen emission reaction may proceed at a low temperature.

In addition, the graphene oxide framework may have a porous structure, and the average diameter of the pores may range from 1 nm to 2 nm. The degree of porosity of the graphene oxide framework may be adjusted depending on the linker, and when the linker is made of benzene-1,4-diboronic acid, the average diameter of the pores may be controlled from 1 nm to 2 nm range. Since the graphene oxide framework of the present disclosure has relatively smaller pores compared to the conventional carbon-based matrix, the particle size may be kept small when the metal hydride penetrates the inside.

As a material for storing hydrogen, the metal hydride may include one or more of $MAlH_4$ or $MBH_4$ (here, M is an alkali metal), and may include one or more of $NaAlH_4$, $NaBH_4$, $LiBH_4$, or $LiAlH_4$. For example, when the metal hydride includes $NaAlH_4$, the metal hydride may have a high hydrogen storage capacity (7.4 wt %) and may release hydrogen at an operating temperature of 100° C. or less of a polymer electrolyte fuel cell through the addition of a catalyst. The hydrogen storage composite material according to the present disclosure may have a hydrogen emission temperature of 25 to 100° C. Hydrogen emission starts at room temperature, and hydrogen emission may be maximized at 75° C.

In addition, the present disclosure provides a manufacturing method of a hydrogen storage composite material.

The manufacturing method of a hydrogen storage composite material according to an embodiment of the present disclosure includes a first step of adding graphene oxide to a solvent and ultrasonic grinding, a second step of forming a graphene oxide framework by providing a linker on the graphene oxide, and a third step of supporting metal hydride on the graphene oxide framework.

In the first step, graphene oxide in powder form is added to a solvent and then dispersed through ultrasonic grinding. At this time, the ratio of carbon to oxygen in graphene oxide may be 2:1. The ultrasonic grinding treatment time may be 30 minutes to 1 hour.

In the second step, a linker is added on the graphene oxide prepared in the first step, and a solvothermal reaction is performed on the mixed solution to form a graphene oxide framework.

In this case, the linker may be diboronic acid, benzene-diboronic acid, and for example, benzene-1,4-diboronic acid.

During the solvothermal reaction of the mixed solution, the mixed solution may be transferred to a Teflon liner and reacted in a high-pressure reaction vessel. The solvothermal reaction temperature is preferably in the range of 80° C. to 120° C., and the solvothermal reaction time is preferably in the range of 40 to 60 hours.

In addition, it may additionally include the step of centrifuging and washing the graphene oxide framework generated after the solvothermal reaction.

Centrifugation is performed at 8000 rpm to 12,000 rpm, preferably at 10,000 rpm for 15 to 25 minutes, and the supernatant is removed to separate the graphene oxide framework.

In addition, remaining impurities or unsynthetic substances of the separated graphene oxide framework may be removed by washing with a volatile solvent.

The washed graphene oxide framework is vacuum-treated at 100° C. to 140° C. for 20 to 30 hours to remove the residual solvent, and then, may be stored in a glove box in an inert gas atmosphere.

The third step is performed to form a metal hydride-graphene oxide framework by infiltrating metal hydride on the graphene oxide framework, and the wet impregnation method is used. The wet impregnation method is more economical than the melt impregnation method, which requires a high temperature of 180° C. or more and a hydrogen pressure of 200 bar or more. In addition, the wet impregnation method may remove the metal hydride remaining in bulk on the surface because it cannot penetrate into the graphene oxide framework through a separate washing process, so that a metal hydride having a homogeneous particle size may be obtained.

In addition, in the third step, the entire process may be performed in an inert gas atmosphere such as Ar or $N_2$.

In addition, the metal hydride may be $MAlH_4$ or $MBH_4$ (here, M is an alkali metal), and may include one or more of $NaAlH_4$, $NaBH_4$, $LiBH_4$, or $LiAlH_4$. For example, it may be $NaAlH_4$.

Specifically, the third step includes a preparing a metal hydride solution by adding metal hydride to an anhydrous volatile solvent, an adding the graphene oxide framework obtained in the second step to the metal hydride solution, and an impregnating metal hydride into the graphene oxide framework by stirring the mixed solution containing metal hydride and graphene oxide framework at room temperature for 12 to 20 hours.

In addition, in the step of preparing the metal hydride solution, filtering the metal hydride solution through a syringe filter made of polytetrafluoroethylene (PTFE) to remove impurities from the metal hydride may be included.

In addition, in the process of penetration of metal hydride onto the graphene oxide framework, the metal hydride is partially reduced, so that the metal hydride-graphene oxide framework has properties similar to the reduced graphene oxide, and as the surface of the material becomes hydrophobic, oxidation stability may be improved.

After the step of infiltrating the metal hydride into the graphene oxide framework, the third step may further include centrifuging and washing the metal hydride-graphene oxide framework.

In the centrifugation step, it is rotated at 8000 rpm to 12,000 rpm, preferably at 10,000 rpm for 15 to 25 minutes, and the supernatant is removed to separate the metal hydride-graphene oxide framework, and the remaining impurities or unreacted substances of separated metal hydride-graphene oxide framework may be removed by washing with a volatile solvent.

The washed metal hydride-graphene oxide framework is vacuum treated for 10 to 14 hours to remove the residual solvent, and the metal hydride-graphene oxide framework may be stored in a glove box in an inert gas atmosphere.

Hereinafter, the disclosure will be described in more detail through embodiments. The embodiments to be described later are intended to illustrate the invention, and the technical idea of the disclosure is not limited by these embodiments.

EXAMPLE

[Synthesis of graphene oxide framework]

200 mg of graphene oxide in the form of powder (carbon to oxygen ratio ~2:1) was added to 20 mL of methanol, and then dispersed through ultrasonic grinding at room temperature for 1 hour. 400 mg of benzene-1,4-diboronic acid to be used as a linker was added to the dispersed graphene oxide solution, and then transferred to a Teflon liner. After the Teflon liner containing the solution was placed in a stainless steel high pressure reaction vessel, solvothermal reaction was performed at 100° C. for 48 hours. After the reaction was completed, the solution was transferred to a conical tube and centrifuged at 10,000 rpm for 20 minutes to discard the supernatant, and the process of washing with methanol was repeated three times. The washed graphene oxide framework was vacuum-treated at 120° C. for 24 hours to remove residual methanol, and then stored in a glove box for the subsequent $NaAlH_4$ penetration process.

[Synthesis of metal hydride-graphene oxide framework (NaAlH$_4$-graphene oxide framework)]

In a glove box in an argon atmosphere, 540 mg of NaAlH$_4$ was dissolved in 10 mL of anhydrous THF to prepare a 1 M solution. All the steps below were carried out in the glove box. In order to remove impurities that may be mixed with NaAlH$_4$, it was filtered through a syringe filter made of PTFE having a pore size of 0.2 μm. After adding 100 mg of graphene oxide framework to 1M NaAlH$_4$ solution, the mixture was stirred at room temperature for 15 hours to infiltrate NaAlH$_4$ into the graphene oxide framework. After transferring the solution containing the NaAlH$_4$-graphene oxide framework into a conical tube, performing centrifugation at 10,000 rpm for 20 minutes, discarding the supernatant and washing with THF was repeated three times. The washed NaAlH$_4$-graphene oxide framework was vacuum-treated at room temperature for 12 hours to remove residual THF, and a final product, a metal hydride-graphene oxide framework, was obtained.

[Evaluation test]

Subsequently, hydrogen emission temperature, temperature programmed desorption test, and oxidation stability evaluation test were performed for NaAlH$_4$-graphene oxide framework prepared under the above conditions and NaAlH$_4$ in bulk.

As a result of the hydrogen emission temperature test, in the case of the metal NaAlH$_4$-graphene oxide framework according to the embodiment of the present disclosure, hydrogen emission started at room temperature and the maximum amount of hydrogen emission was shown at 75° C. On the other hand, as a comparative example, the hydrogen emission reaction of NaAlH$_4$ in the bulk state started at 180° C., the first reaction showed the maximum hydrogen emission at 275° C., the second reaction showed the maximum hydrogen emission at 310° C., and the third reaction showed the maximum hydrogen emission at 410° C.

As a result of the temperature programmed desorption test by the Kissinger method, the hydrogen emission reaction activation energy of the NaAlH$_4$-graphene oxide framework material according to the embodiment of the present disclosure was reduced by more than 100 kJ/mol compared to NaAlH$_4$ in the bulk state.

As a result of evaluating the oxidation stability after exposure to air for 7 days, the NaAlH$_4$-graphene oxide framework according to the embodiment of the present disclosure maintained more than 50% performance compared to the hydrogen emission amount immediately after synthesis. On the other hand, as a comparative example, NaAlH$_4$ in a bulk state reacted with oxygen and moisture and hardly released hydrogen.

Those of ordinary skill in the technical field to which the present disclosure belongs will understand that the present disclosure may be implemented in a form different from the disclosed embodiments without changing the technical idea or essential characteristics of the present disclosure. The disclosed embodiments are exemplary and should not be construed as limiting.

Since the hydrogen storage composite material according to the embodiment of the present disclosure contains boron (B) atoms acting as a catalyst for a hydrogen emission reaction, the hydrogen emission performance may be improved by improving the dynamic properties of metal hydride. Thus, the hydrogen emission reaction can proceed at a low temperature.

Since the graphene oxide framework according to an embodiment of the present disclosure has an average diameter of pores in the range of 1 nm to 2 nm, the particle size can be kept small when metal hydride penetrates the inside.

The hydrogen storage composite material according to the embodiment of the present disclosure has properties similar to those of reduced graphene oxide, and the surface of the material becomes hydrophobic, so that oxidation stability may be improved.

Since the manufacturing method of the hydrogen storage composite material according to the embodiment of the present disclosure uses the wet impregnation method, economic efficiency is secured compared to the melt impregnation method, and metal hydride remaining in bulk on the surface can be removed through a separate washing process. Therefore, it is possible to obtain a metal hydride having a homogeneous particle size.

What is claimed is:

1. A hydrogen storage composite material comprising a graphene oxide framework as a porous structure and having an average pore diameter of 1 nm or more and less than 2 nm, wherein the graphene oxide framework is impregnated with a metal hydride, wherein the metal hydride comprises NaAlH$_4$, and wherein the graphene oxide framework comprises:
a graphene oxide; and a linker connecting the graphene oxide,
wherein the linker includes a diboronic acid,
wherein the graphene oxide framework has a hydrophobic surface, and
wherein a hydrogen emission temperature of the hydrogen storage composite material is 25-100° C.

2. A manufacturing method of the hydrogen storage composite material of claim 1, the method comprises:
a first step of the adding graphene oxide to a solvent and ultrasonic grinding;
a second step of forming the graphene oxide framework by providing the linker on the graphene oxide; and
a third step of supporting the metal hydride on the graphene oxide framework.

3. The manufacturing method according to claim 2, wherein the second step includes forming the graphene oxide framework by a solvothermal reaction.

4. The manufacturing method according to claim 2, wherein the graphene oxide framework comprises boron.

* * * * *